United States Patent
Lin

(10) Patent No.: US 6,442,174 B1
(45) Date of Patent: Aug. 27, 2002

(54) METHOD FOR SAVING POWER IN A NETWORK SYSTEM

(75) Inventor: Ho-Shyan Lin, Hsinchu (TW)

(73) Assignee: Winbond Electronics Corp., Hsinchu (TW)

(*) Notice: Subject to any disclaimer, the term of this patent is extended or adjusted under 35 U.S.C. 154(b) by 0 days.

(21) Appl. No.: 09/089,166

(22) Filed: Jun. 2, 1998

(30) Foreign Application Priority Data

Mar. 17, 1998 (TW) .......................................... 87103967

(51) Int. Cl.[7] .................................................. H04J 3/16
(52) U.S. Cl. ........................ 370/466; 370/252; 370/348; 370/401; 370/444; 370/450; 370/459
(58) Field of Search ................................ 370/401, 402, 370/404, 453, 465, 466, 467, 501, 445, 252, 348, 443, 444, 450, 454, 455, 456, 459

(56) References Cited

U.S. PATENT DOCUMENTS 5,610,903 A * 3/1997 Crayford .................... 370/445
5,805,597 A * 9/1998 Edem ......................... 370/445

* cited by examiner

Primary Examiner—Douglas Olms
Assistant Examiner—Shick Hom
(74) Attorney, Agent, or Firm—Ladas & Parry

(57) ABSTRACT

A method for saving power in a network system, such as the Ethernet. Assume that all nodes in the network system can support at least two transmission protocols, such as 10 BaseT and 100 BaseTX in the Ethernet. First, network nodes may continuously detect the status of the network system and determine whether the network is in an idle state. If the idle period exceeds a pre-determined period, a first auto-negotiation function, in which priorities of the transmission protocols are inversely proportional to the power consumption, will be activated to select 10 BaseT. When the network system attempts to transmit data, a second auto-negotiation function, in which priorities of the transmission protocols are directly proportional to the data transmission performance, will be activated to select 100 BaseTX.

10 Claims, 3 Drawing Sheets

| PRIORITY | PHYSICAL LAYER PROTOCOL |
|---|---|
| 1 | 100BaseTx (FULL DUPLEX) |
| 2 | 100BaseT4 |
| 3 | 100BaseTx |
| 4 | 10BaseT (FULL DUPLEX) |
| 5 | 10BaseT |

FIG. 5

| PRIORITY | PHYSICAL LAYER PROTOCOL |
|---|---|
| 1 | 10BaseT |
| 2 | 10BaseT (FULL DUPLEX) |
| 3 | 100BaseTx |
| 4 | 100BaseT4 |
| 5 | 100BaseTx (FULL DUPLEX) |

FIG. 6

METHOD FOR SAVING POWER IN A NETWORK SYSTEM

BACKGROUND OF THE INVENTION

1. Field of the Invention

The present invention relates in general to a method for saving consumed power in a network system, more specifically, to a method for controlling network nodes to be operated in a power-saving transmission protocol by utilizing the auto-negotiation function provided by a typical fast Ethernet controller when the network system is idle, thereby reducing the overall power consumption of the network system.

2. Description of the Related Art

An Ethernet is one of the most widely employed local area networks (LAN). In addition, an Ethernet. is similar to the IEEE 802.3 standard proposed by the Institute for Electrical and Electronic Engineers (IEEE), except for the packet format. The access control in the Ethernet is mainly achieved by Carrier Sense Multiple Access/Collision Detection (CSMA/CD).

FIG. 1 (Prior Art) illustrates the network topology of an example of the Ethernet. As shown in FIG. 1, Ethernet 10 minimally comprises four network nodes, which are denoted by N1, N2, N3 and N4, respectively. Fundamentally, the Ethernet does not comply with master-slave architecture; in other words, any network node in the Ethernet owns the same right to access the data transmitted therein. When one of these network nodes attempts to send data (packets), this network node should first detect the status of the Ethernet 10 and judge whether any other network node is sending data or not. This can prevent the collision of the packets sent from different sources. In an Ethernet, the detection scheme which depends on the absence or presence of carrier signals, is called Carrier Sense (CS). The feature that every packet sent to the Ethernet 10 can be accessed by all network nodes in Ethernet 10 is called Multiple Access (MA). In the practical accessing process, each network node can determine the source and destination network nodes of a data packet according to a source node code and a destination node code therein. In addition, each of these nodes is capable of detecting data collision in Ethernet 10. This feature is called Collision Detection (CD). When data collision occurs, the network nodes that are currently transmitting packets temporarily cease transmission. Transmission can resume after a time period, which is randomly specified by the network nodes. According to the above description, all network nodes in Ethernet 10 have equal access.

The Ethernet protocol can be divided into various physical-layer protocols, depending on the data transmission speed and the transmission media. For example, some popular physical-layer protocols are 10 BaseT, 10 Base2, 10 Base5 and 100 BaseT. Among these notations, the first number before "Base" represents the operating speed of the Ethernet implementations in megahertz. For example, "10" represents the 10 Mbps (megabytes per second) and "100" represents the 100 Mbps. In addition, the last character or number denotes the transmission media employed in this Ethernet implementation. For example, "T" represents the twisted pair like the telephone wiring lines, "2" represents a thin coaxial cable like RG-58A/U, and "5" represents a think coaxial cable like RG-8. Currently the Ethernet implementations 10 BaseT and 100 BaseT are most widely used. In addition, 100 BaseT can be further divided into 100 BaseTX, 100 BaseT4 and 100 BaseTF. 100 BaseTX employs UTP5 (Unshield Twisted Pair, No. 5) wires, 100 BaseT4 employs UTP3 or UTP4, and 100 BaseTF employs optical fibers.

In fact, the 10 BaseT and 100 BaseTX physical-layer protocols not only differ in the transmission media, but also in the signal waveform transmitted in the wiring. FIG. 2A (Prior Art) illustrates a typical signal waveform diagram in the wiring of the Ethernet implemented by the 10 BaseT physical-layer protocol. As shown in FIG. 2A, two regions of the signal waveform in the wiring of 10 BaseT can be distinguished. One is for the data transmission period, which is denoted by "Tx," and another is for the network idle period, which is denoted by "Idle." Data transmitted in the data transmission period Tx may be data packets or control signals for some network protocols. On the other hand, the network idle period "Idle" contains no waveform.

In addition, the signal waveform in the 100 BaseT implementation is different from that in the 10 BaseT implementation. FIG. 2B (Prior Art) illustrates a typical signal waveform diagram in the wiring of the Ethernet implemented by 100 BaseTX physical-layer protocol. As shown in FIG. 2B, the wiring in the 100 BaseTX contains waveforms in both the data transmission period and the network idle period. This is due to the scrambling process adopted by the 100 BaseT implementation before transmitting data. Typically, the 100 BaseT implementation may scramble four-bit digital data into five-bit scrambled data for practical transmission. Therefore, the original digital data in the network idle period, which should be all zeros, may be scrambled into a digital code containing information "1," thereby producing a signal waveform in the wiring in response to the information "1."

On the other hand, manufacturers usually incorporate the 10 BaseT implementation into 100 BaseTX Ethernet cards to ensure the compatibility of 10 BaseT and 100 BaseTx in the same wiring network. In other words, an Ethernet card having the 10 BaseT and 100 BaseTX implementations can automatically adjust the settings according to the practical situation. However, since the transmission performance of the 100 BaseTX implementation is superior to that of the 10 BaseT implementation, the 10 BaseT/100 BaseTX network card gives top priority to the 100 BaseTX physical-layer protocol. Therefore, if a 10 BaseT/100 BaseTX network card is trying to setup the connection with another network node supporting 100 BaseTX, the 100 BaseTX physical-layer protocol will be chosen for the network operation. In addition, it is apparent that the old-fashioned 10 BaseT network card cannot transmit data at an operating speed of 100 Mbps. Therefore, if the 10 BaseT/100 BaseTX network card is trying to setup the connection with another network node only supporting 10 BaseT, the 10 BaseT physical-layer protocol will be chosen for the network operation. Deciding the appropriate Ethernet physical-layer protocol for the network setup is achieved by the auto-negotiation function.

The above description is an overview of the Ethernet application to date. It is readily found that network cards supporting both of 100 BaseTX and 10 BaseT will be widely adopted in the market since their superior performance and compatibility. However, the 100 BaseTX implementation still has some shortcomings. Referring to FIG. 2B, signal waveforms are always present in the wiring of the Ethernet using 100 BaseTX, during both the data transmission period and the network idle period. In other words, the network system will always consume power at any time. Usually, there is plenty of network traffic in the daytime, but relatively little or none at night. Clearly, the network wastes power during such idle periods. Therefore, the present invention addresses the problem of power consumption in the Ethernet using 100 BaseTX.

SUMMARY OF THE INVENTION

Therefore, an object of the present invention is to provide a method for saving power in a network system, such as the 100 BaseTX network that would otherwise waste a great deal of power during idle periods. In addition, this method provides an automatic switching function, which can switch to a physical-layer protocol that uses less power when the network system is in an idle condition.

The present invention achieves the above-indicated objects by providing a method for saving power in a network system. It is assumed that the network system is capable of executing at least two transmission protocols, such as 10 BaseT and 100 BaseTX in the modern Ethernet system. First, the network nodes may continuously detect the status of the network system and determine if it is in an idle period. If the idle period exceeds a pre-determined period, a first auto-negotiation function will be activated to select one of the transmission protocols. In the first auto-negotiation function, priorities of these transmission protocols are inversely proportional to the power consumption. That is, a transmission protocol consuming less power in the idle period will be set to a higher priority, and a transmission protocol consuming more power in the idle period will be set to a lower priority. In the case of Ethernet, the 10 BaseT implementation has a higher priority than that of the 100 BaseTX implementation. When the network system is going to transmit data, a second auto-negotiation function will be activated to select one of said transmission protocols. In the second auto-negotiation function, priorities of these transmission protocols are directly proportional to the data transmission performance. That is, a transmission protocol having higher transmission performance is set to a higher priority and a transmission protocol having lower transmission performance is set to a lower priority. In the case of Ethernet, the 100 BaseTX implementation has a higher priority than that of the 10 BaseT implementation.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 5 is a priority table adopted by step S4 in the flowchart of FIG. 4; and

FIG. 6 is a priority table adopted by step S3 in the flowchart of FIG. 4.

DETAILED DESCRIPTION OF THE PREFERRED EMBODIMENTS

The method for saving power in the network system disclosed in the present invention is to select one of various physical-layer protocols implemented in Ethernet that is appropriate to the current status of the network system by using an auto-negotiation function. It is evident that a network system may be in the data transmission state or in the idle state. The 100 BaseTX implementation may consume more power since waveforms always exist, regardless of the current status of the network. However, the 10 BaseT implementation may consume power in the data transmission state but not in the idle state. In the following embodiment, the Ethernet can be switched between 10 BaseT and 100 BaseTX by using two different auto-negotiation functions according to the current state of the network, thereby optimizing the power consumption of the network system. It is known that 100 BaseTX has higher data transmission speed in the transmission period, but consumes more power in the idle period. Therefore, the 100 BaseTX physical-layer protocol will be chosen in the data transmission period. On the other hand, 10 BaseT has lower data transmission speed in the transmission period, but consumes less power in the idle period. Therefore, when the idle period of the network system reaches a pre-determined period, the network nodes of the Ethernet will be switched to the 10 BaseT physical-layer protocol by means of the auto-negotiation function. However, before starting to transmit data, these network nodes will be switched back to the 100 BaseTX physical-layer protocol by the same said auto-negotiation function. Referring to the accompanying drawings, the preferred embodiment of the present invention will be described as follows.

Figure 1:
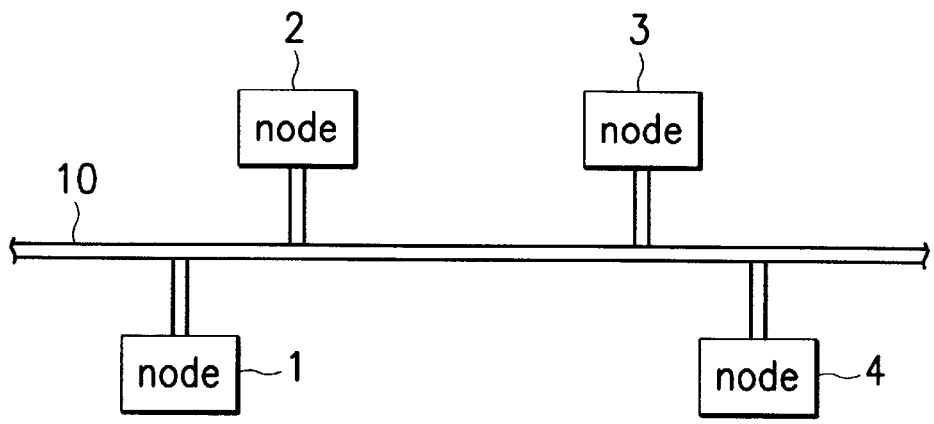
FIG. 1 (Prior Art) illustrates the network topology of a simple Ethernet.
Figure 2A:
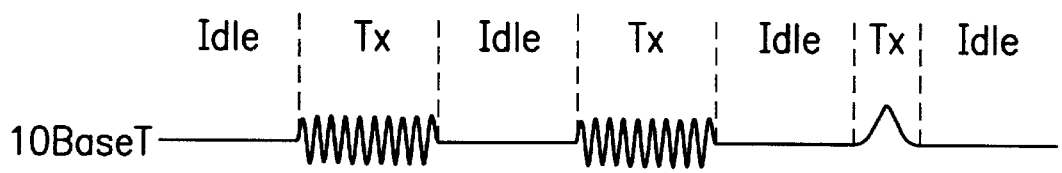
FIG. 2A (Prior Art) illustrates a typical signal waveform diagram in the wiring of the 10 BaseT network.
Figure 2B:
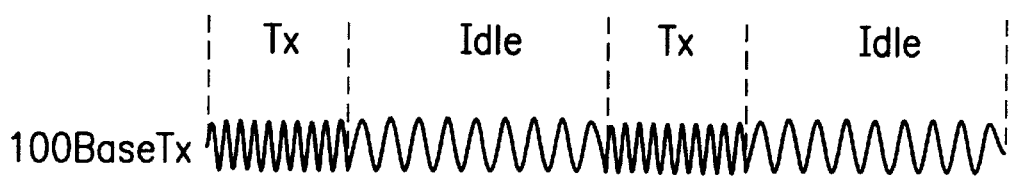
FIG. 2B (Prior Art) illustrates a typical signal waveform diagram in the wiring of the 100 BaseTX network.
Figure 3:
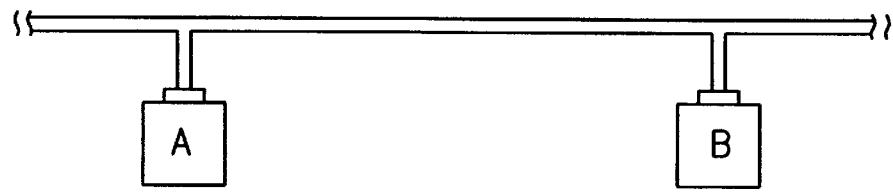
FIG. 3 shows an Ethernet topology diagram for explanation in the embodiment of the present invention.

FIG. 3 shows an Ethernet topology diagram for explanation of the embodiment of the present invention. The exemplified network comprises two network nodes, which are denoted by node A and node B, respectively. There are four cases for the transmission protocol capabilities of the two network nodes in FIG. 3. The first case is that the two network nodes only have the 10 BaseT implementation. The second case is that one network node has the 10 BaseT/100 BaseTX implementations and another network node only has the 10 BaseT implementation. The third case is that one network node has the 10 BaseT/100 BaseTX implementations and another network node only has the 100 BaseTX implementation. The fourth case is that both of the two network nodes have the 10 BaseT/100 BaseTX implementations. Clearly, the first three cases cannot be manipulated by the method disclosed in this preferred embodiment since only one physical-layer protocol can be chosen. For example, in the first or second case, only 10 BaseT is compatible with both of the network nodes. In the third case, only 100 BaseTX is compatible with both of the network nodes. Therefore, only the fourth case where both of the network nodes have the 10 BaseT/100 BaseTX implementations will be manipulated in the following discussion. In addition, it is understood by those skilled in the art that the power-saving method disclosed in the preferred embodiment also can be applied to an N-way communication network.

Figure 4:
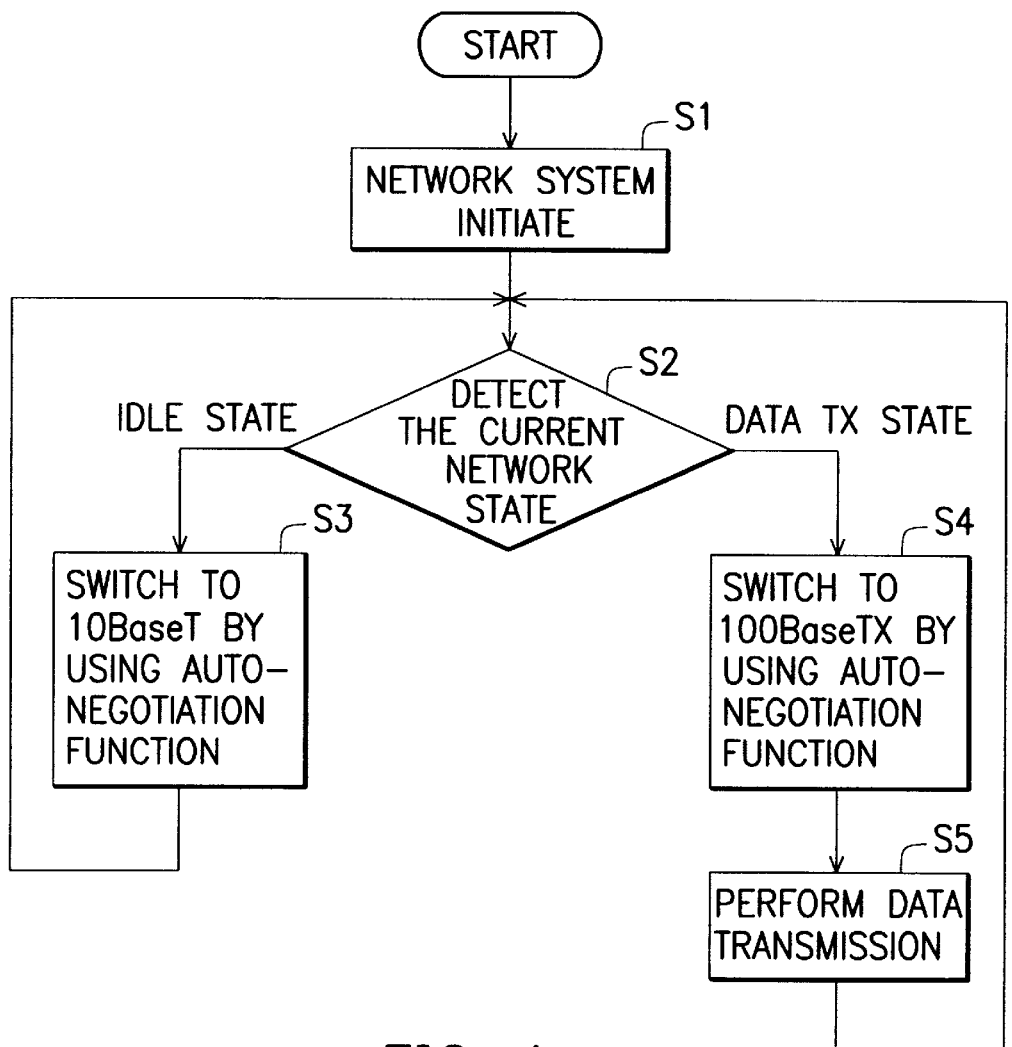
FIG. 4 shows a flowchart of the method for saving power in the network system by using auto-negotiation function in the embodiment of the present invention.

FIG. 4 shows a flowchart of the power-saving method in the preferred embodiment. First, the network system, such as the one shown in FIG. 3, is initiated by normal hardware and software procedure (step S1). In the normal procedure of initiating the network system, nodes A and B may choose 100 BaseTX as the current physical-layer protocol by using a first auto-negotiation function. In other words, the first auto-negotiation function defines the priority of 100 BaseTX as the highest. When the whole network system settles down, node A and node B of the Ethernet may detect the status of the network, respectively, and determine that the current network status is the idle state or the data transmission state (step S2). In the following discussion, the idle state is a state in which no node in the network system transmits any data within a pre-determined period. The data transmission state is a state in which a network node is transmitting data or requests the transmission of data. When the network system is in the idle state, node A (or node B) may automatically activate a first auto-negotiation function and switch to the 10 BaseT physical-layer protocol (step S3). On the other hand, when the network system is in the data transmission state, node A (or node B) may activate a second auto-negotiation function that is the same as that in the Ethernet standards and switch to the 100 BaseTX physical-layer protocol (step S4). Briefly speaking, in the procedure shown in FIG. 4, the network system in the normal operation will adopt 100 BaseTX to be the physical-layer protocol, which can increase the transmission performance. The network system may switch to 10 BaseT only when the idle period of the network system exceeds a pre-determined period, for example, 1 minute.

In addition, in the procedure shown in FIG. 4, step S3 and step S4 employ the auto-negotiation functions to achieve the switching of the physical layer protocol. The auto-negotiation functions adopted by the two steps (S3, S4) differ in the settings of the protocol priorities.

Auto-negotiation is used to enhance the compatibility of a fast Ethernet and decide the most appropriate communication protocol between the network nodes. Fundamentally, auto-negotiation proceed by means of fast link pulses (FLPs). In addition, priorities dedicated to these communication protocols decide how to select the desired communication protocol. In the usual auto-negotiation function provided by the Ethernet, 100 BaseTX has the highest priority. In other words, if all network nodes can support the 100 BaseTX protocol, 100 BaseTX will be chosen. On the other hand, 10 BaseT is set as the lowest priority. In other words, 10 BaseT will be chosen only if one or more network nodes cannot support the 100 BaseTX protocol or other higher-priority protocols in the network. In FIG. 4, step S4 and the network initiation step adopts the usual auto-negotiation function as described above. Therefore, the network system can be correctly switched to the 100 BaseTX physical-layer protocol. FIG. 5 is a priority table used in the usual auto-negotiation function (the second auto-negotiation function) in this preferred embodiment.

On the other hand, step S3 in FIG. 4 adopts a modified auto-negotiation function (the first auto-negotiation function) to switch to the 10 BaseT physical-layer protocol. Therefore, priorities that differ from those defined in FIG. 5 are employed in the modified auto-negotiation function. In the modified auto-negotiation function, 10 BaseT has highest priority, and 100 BastTX or other physical layer protocols have lower priorities. FIG. 6 is a priority table used in the modified auto-negotiation function. According to the priorities defined in FIG. 6, all network nodes in the network can select 10 BaseT in the network idle state by using the modified auto-negotiation function. In addition, the priorities of the physical layer protocols defined in FIG. 6 are determined according to the power consumption within the idle period. Therefore, 10 BaseT and 10 BaseT (Full Duplex) can be regarded as the same priority. In addition, other physical-layer protocols that provide the transmission speed of 100 Mbps also can be regarded as the same priority.

According to the procedure shown in FIG. 4, the network system in the preferred embodiment can switch to 100 BaseTX for increasing the data transmission speed before transmitting data, and switch to 10 BaseT for saving power when the system is idle for a pre-determined period. Therefore, the objective of the present invention is obtained. In addition, the original auto-negotiation function and the modified auto-negotiation function can directly employ the processing mechanism defined in the original auto-negotiation function. The only difference between them is the setting of the priorities dedicated to these physical-layer protocols. Before negotiation, all network nodes can identify the purpose of this negotiation, and, therefore, can employ an appropriate priority table. Since the auto-negotiation function already exists in the Ethernet protocol, the power-saving method disclosed in the present invention can be implemented at low cost and readily applied to general communication networks.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for saving power in a network system, said network system being capable of executing a first transmission protocol and a second transmission protocol, the data transmission performance of said first transmission protocol being higher than that of said second transmission protocol, and the power consumption of said second transmission protocol being less than that of said first transmission protocol, comprising the steps of:

detecting an idle period of said network system;

comparing said idle period with a pre-determined period;

switching said network system to said second transmission protocol when said idle period exceeds said pre-determined period;

switching said network system back to said first transmission protocol when a data transmission occurs in said network system, and said first transmission protocol sending waveform in said idle period; and activating an auto-negotiation function to select one of said transmission protocols when said idle period exceeds said pre-determined period, the priorities of said transmission protocols in said auto-negotiation function being directly proportional to the power consumption of said transmission protocols.

2. The method as recited in claim 1, wherein said network system is implemented by an Ethernet, said first transmission protocol being 100 BaseT and said second transmission protocol being 10 BaseT.

3. The method as recited in claim 2, wherein switching to said second transmission protocol of said network system is achieved by an auto-negotiation function, in which 10 BaseT is set to a higher priority and 100 BaseT is set to a lower priority.

4. The method as recited in claim 2, wherein switching to said first transmission protocol of said network system is achieved by an auto-negotiation function, in which 100 BaseT is set to a higher priority and 10 BaseT is set to a lower priority.

5. A method for saving power in a network system, said network system being capable of executing at least two transmission protocols, comprising the steps of:

detecting an idle period of said network system;

comparing said idle period with a pre-determined period;

activating a first auto-negotiation function to select one of said transmission protocols when said idle period exceeds said pre-determined period, the priorities of said transmission protocols in said first auto-negotiation function being directly proportional to the power consumption of said transmission protocols; and activating a second auto-negotiation function to select one of said transmission protocols when a data transmission occurs in said network system, the priorities of said transmission protocols in said second auto-negotiation function being inversely proportional to the data transmission performance of said transmission protocols.

6. The method as recited in claim 5, wherein said network system is implemented by an Ethernet.

7. The method as recited in claim 6, wherein 10 BaseT is set to a highest priority and 100 BaseTX is set to a lowest priority in said first auto-negotiation function.

8. The method as recited in claim 6, wherein 100 BaseT is set to a highest priority and 10 BaseT is set to a lowest priority in said second auto-negotiation function.

9. A method for saving power in a network system, said network system being capable of executing a first transmission protocol and a second transmission protocol, the data transmission performance of said first transmission protocol being higher than that of said second transmission protocol, and the power consumption of said second transmission protocol being less than that of said first transmission protocol, comprising the steps of:

detecting an idle period of said network system;

comparing said idle period with a pre-determined period;

switching said network system to said second transmission protocol when said idle period exceeds said pre-determined period;

switching said network system back to said first transmission protocol when a data transmission occurs in said network system, and said first transmission protocol sending waveform in said idle period; and activating an auto-negotiation function to select one of said transmission protocols when said data transmission occurs in said network system, the priorities of said transmission protocols in said auto-negotiation function being inversely proportional to the data transmission performance of said transmission protocols.

10. The method as recited in claim 1, wherein said second transmission protocol has no signal output in said idle period.

* * * * *